Feb. 7, 1967     H. J. MANN, JR     3,302,285
TUBING CUTTER HAVING PIVOTALLY MOUNTED DRIVE ROLLER
Filed June 27, 1966

HAROLD J. MANN, JR.
INVENTOR.

BY *Herbert J. Brown*

ATTORNEY

United States Patent Office 3,302,285
Patented Feb. 7, 1967

3,302,285
TUBING CUTTER HAVING PIVOTALLY MOUNTED DRIVE ROLLER
Harold J. Mann, Jr., 4424 E. Lancaster,
Fort Worth, Tex. 76103
Filed June 27, 1966, Ser. No. 560,644
3 Claims. (Cl. 30—102)

This invention relates to pipe and tubing cutters and has reference to a portable device for on the job use. Particularly, the present device is intended for use by plumbers for cutting copper tubing, but the invention is not limited to such use.

Heretofore, on the job cutting of pipe and tubing was done, primarily, with a conventional pipe cutter which consisted of a jaw-like frame, a pair of freely rotatable cutters mounted therein and a third rotatable cutter on a screw threaded in the frame. All three cutters were arranged to define a single circumferential line around the pipe or tube to be cut. By rotating or oscillating the assembly, and tightening the screw from time to time, the pipe or tube was severed. Such operation was time consuming and left an excessive amount of burrs on the severed ends of the pipe or tube.

In addition to the conventional pipe cutter referred to, certain power driven devices have been proposed which might be considered portable. However, these prior devices were complicated and expensive compared to the present invention.

The present invention is directed to a drive roller rotatably mounted on a pair of pivoted arms and has a roller cutter at one end thereof. Both the drive roller and the cutter contact the tube to be cut which is supported for free rotation in a roller cradle.

An object of the invention is to provide a portable inexpensive pipe and tubing cutter intended, primarily, for on the job use.

Another object, in the preferred form of the invention, is to provide a manually operated pipe and tubing cutter which is quick and efficient in its operation.

Another object, in a second form of the invention, is to provide a portable power driven pipe or tubing cutter of simple and economical construction.

A further object of the invention is to provide a portable pipe or tubing cutter which does not require adjustment during its operation.

These and other objects of the invention will become apparent from the following description and the accompanying drawing, in which.

Figure 1:
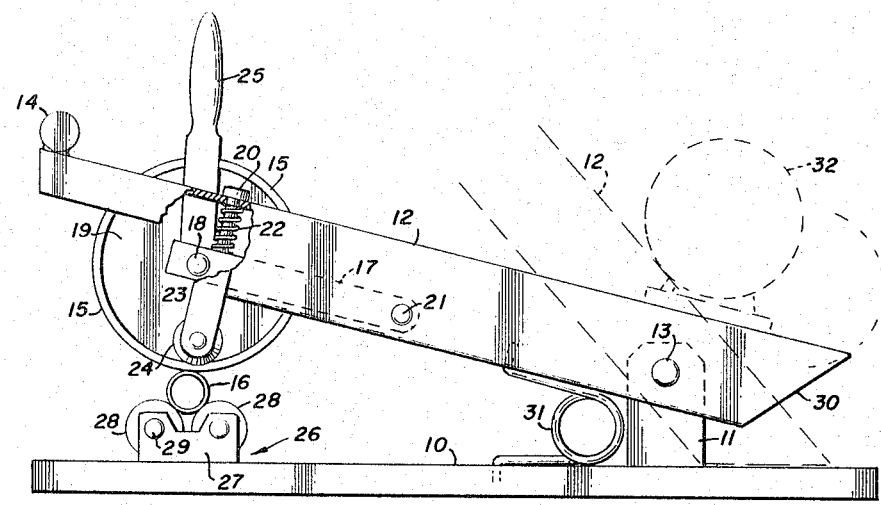
FIGURE 1 is a side elevational view, shown partly in broken section, of a pipe or tubing cutter according to the invention. The raised position of the drive roller supporting arms is shown by dotted lines as well as the location of the motor of a second form of the invention.
Figure 3:
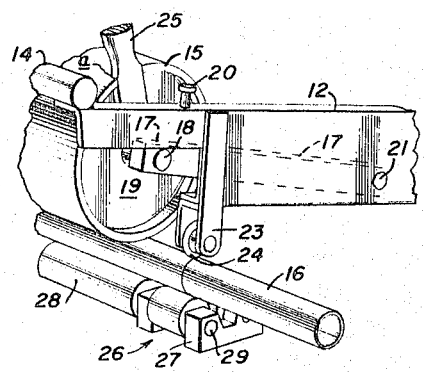
FIGURE 3 is a broken perspective view of a portion of the drive roller and operating lever and showing the roller cutter in contact with a length of tubing to be severed.
Figure 2:
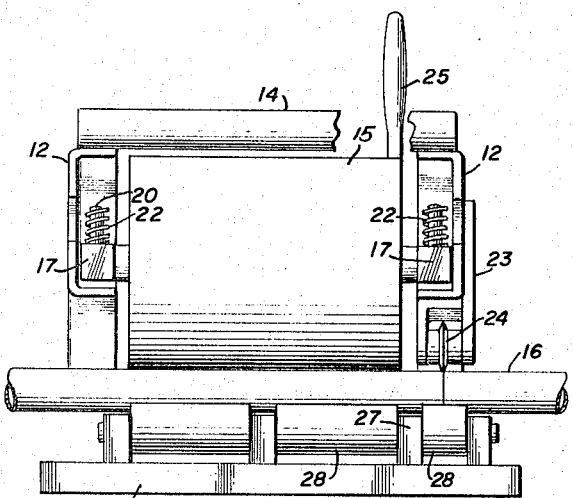
FIGURE 2 is a broken front end elevational view of FIGURE 1.

The form of the invention shown in FIGURES 1-3 includes a rectangular base plate 10, spaced upstanding arm supports 11 near one end of the base and parallel primary arms 12 pivotally supported near their ends by pins 13 through the upper ends of the arm supports. The extending ends of the arms 12 have a presser bar 14 connected therebetween, and which presser bar has to do with applying direct pressure to a roller cutter, to be described.

A feature of the invention has to do with a relatively large drive roller 15 which frictionally engages the tubing or pipe 16 to be cut. The primary arms 12 are of channel stock and each has an auxiliary supporting arm 17 therein. Pivot pins 21 through the inner ends of the auxiliary arms 17 and through adjacent walls of the primary arms pivotally support the auxiliary arms in place. The forward ends of the auxiliary arms 17 support a shaft 18 which extends through circular plates 19 in the ends of the drive roller 15. Each auxiliary arm 17 has a headed pin 20 extending upwardly through the upper surface of its primary arm 12, with the head of the pin positioned outwardly thereof. Around the headed pin 20 between each auxiliary arm 17 and the upper surface of the primary arm 12 there is a coiled compression spring 22 which resiliently urges the drive roller 15 downwardly when the presser arm 14 is depressed.

On one of the primary arms 12, and outwardly of the side thereof, there is a depending bifurcated bracket 23 having a roller cutter 24 mounted for free rotation in its lower end. Normally, the bottom of the drive roller 15 is below the bottom of the roller cutter 24 whereby the drive roller makes contact with the tubing 16 before the cutter. As best shown in FIGURE 3, the circular plates 19 in the ends of the drive roller 15 are recessed and the end periphery of one end of the drive roller is notched at $a$ to receive a hand lever 25. The adjacent shaft 18 extends through one end of the lever 25, whereas the remaining end of the lever extends upwardly whereby the drive roller 15 may be oscillated by hand, preferably within an angle of 120 degrees.

Beneath and parallel with the drive roller 15 there is a roller cradle 26 comprised of spaced vertical supports 27 having idler rollers 28 therebetween. The rollers 28 are supported on two parallel shafts 29 and the rollers are spaced from each other so as to support the tubing 16 to be cut directly, or nearly directly, beneath the drive roller 15 and the rolling cutter 24. As best shown in FIGURE 2, the two rollers 28 beneath the roller cutter 24 are relatively short, and by reason of the supports 27 adjacent the ends thereof the tubing 16 is well supported at the time of the cutting operation.

Other details shown in FIGURE 1 include diagonal extending ends 30 of the primary arms 12 which serve as stops when the arms are in their raised position. Also shown in FIGURE 1 there is a hairpin spring 31 which normally holds the primary arms 12 in their raised position.

Figure 4:
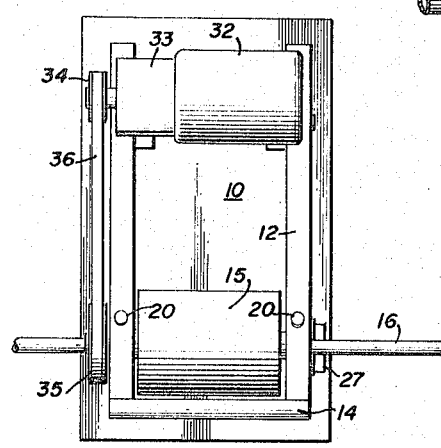
FIGURE 4 is a reduced scale top plan view of a modified form of the invention including a motor as first referred to in connection with FIGURE 1.

The form of the invention illustrated in FIGURE 4 is like the foregoing, except that the hand lever 25 is eliminated and instead an electric motor 32, reduction gear 33 and drive pulley 34 are transversely mounted on the primary arms 12 near their pivotal supports. Instead of the lever arm 25, there is a driven pulley 35 axially mounted on the end of the drive roller 15 and a belt 36 connects the drive and driven pulleys 35 and 34.

Referring now to the operation of the first described form of the invention, the tubing 16 to be cut is placed in the cradle 26 with the circumference to be cut directly beneath the roller cutter 24. The presser bar 14 is then pressed downwardly causing first the drive roller 15 to contact the tubing 16 and continued downward movement causes the roller cutter to contact the tubing. While applying pressure to the bar 14 the lever 25 is oscillated and frictional engagement of the drive roller 15 with the tubing 16 causes the latter to make more than one complete revolution. The continued movement of the lever 25 and downward pressure of the bar 14 causes the cutter to sever the tubing 16.

The operation of the form of the invention illustrated in FIGURE 4 is the same except that the motor 32 is used to cause the drive roller 15 to rotate in the same direction at all times. The same placement of the tubing 16 in the cradle takes place and the same pressure is applied to the presser bar 14 with the result that the drive roller contacts and rotates the tubing 16 and the cutter 24 severs the tubing by reason of continued pressure on the presser bar.

The invention is not limited to the exemplary construction herein shown and described, but may be made in various ways within the scope of the appended claims.

What is claimed is:

1. A tubing cutter comprised of a base plate having front and rear ends, a pair of parallel primary arms pivotally mounted at corresponding ends to said base plate at the rear end thereof for movement about a common axis, a presser bar connecting the remaining ends of said primary arms, auxiliary arms pivotally mounted at corresponding ends on said primary arms intermediate the ends thereof and extending toward the ends of said primary arms including said presser bar, a drive roller rotatably mounted between the extending ends of said auxiliary arms, spring means connecting said auxiliary arms with said primary arms, a depending roller cutter rigidly mounted on one of said primary arms, a roller cradle on said base plate beneath said drive roller and said cutter and parallel with the axes thereof, and means rotatably moving said drive roller.

2. A tubing cutter as defined in claim 1 and wherein the diameter of said drive roller is substantially greater than the diameter of the tubing to be cut, and including a hand lever connected with said drive roller comprising said means rotatably moving the same.

3. A tubing cutter as defined in claim 1, and wherein said means rotatably moving said drive roller is comprised of a motor mounted on said primary arms, a drive pulley driven thereby, a driven pulley axially mounted on said drive roller, and a belt connecting said drive and driven pulleys.

No references cited.

WILLIAM FELDMAN, *Primary Examiner.*

M. C. KRUSE, *Assistant Examiner.*